United States Patent
Seltzer et al.

(10) Patent No.: US 8,428,859 B2
(45) Date of Patent: Apr. 23, 2013

(54) FEDERATED ROUTE PRODUCTION

(75) Inventors: Michael Lews Seltzer, Seattle, WA (US); John C. Krumm, Redmond, WA (US); Jeffrey D. Couckuyt, Bothell, WA (US); Ivan J. Tashev, Kirkland, WA (US); Ruston Panabaker, Redmond, WA (US); Neil W. Black, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 940 days.

(21) Appl. No.: 11/957,127

(22) Filed: Dec. 14, 2007

(65) Prior Publication Data

US 2009/0157311 A1 Jun. 18, 2009

(51) Int. Cl.
*G01C 21/00* (2006.01)
(52) U.S. Cl.
USPC .............. 701/206; 701/411; 340/991
(58) Field of Classification Search ......... 701/200–210, 701/408–411, 414, 416, 469, 117, 119; 340/990, 340/995.1–995.28, 991; 342/357.31
See application file for complete search history.

(56) References Cited

U.S. PATENT DOCUMENTS

| 4,939,663 A | 7/1990 | Baird |
| 5,187,667 A | 2/1993 | Short |
| 5,422,813 A | 6/1995 | Schuchman et al. |
| 5,504,482 A | 4/1996 | Schreder |
| 5,629,854 A | 5/1997 | Schulte |
| 5,648,768 A | 7/1997 | Bouve |
| 5,774,073 A | 6/1998 | Maekawa et al. |
| 5,802,492 A | 9/1998 | DeLorme |
| 5,938,720 A | 8/1999 | Tamai |
| 5,987,381 A | 11/1999 | Oshizawa |
| 6,038,444 A | 3/2000 | Schipper et al. |
| 6,060,989 A | 5/2000 | Gehlot |
| 6,119,065 A | 9/2000 | Shimada et al. |
| 6,199,009 B1 | 3/2001 | Meis et al. |
| 6,199,045 B1 | 3/2001 | Giniger |
| 6,249,742 B1 | 6/2001 | Friederich et al. |
| 6,253,980 B1 | 7/2001 | Murakami et al. |
| 6,317,686 B1 | 11/2001 | Ran |

(Continued)

FOREIGN PATENT DOCUMENTS

| EP | 1519288 A2 | 3/2005 |
| EP | 1659368 A1 | 5/2006 |

(Continued)

OTHER PUBLICATIONS

MPOS AdSpace http://www.xiam.com/xiam.products.adspace.shtml. Last accessed Oct. 5, 2007, 1 page.

(Continued)

*Primary Examiner* — Thomas Black
*Assistant Examiner* — Luke Huynh
(74) *Attorney, Agent, or Firm* — Shook, Hardy & Bacon L.L.P.

(57) ABSTRACT

A route can be generated through utilization of a conventional manner, such as a portable electronic device accessing a database with roads, traffic information, weather data, and the like. As a user approaches a private area, the route can be augmented with travel information concerning the private area. Artificial intelligence techniques can be used to determine if a route should be augmented, to infer what augmentations to make, etc.

20 Claims, 10 Drawing Sheets

U.S. PATENT DOCUMENTS

| | | |
|---|---|---|
| 6,321,158 B1 | 11/2001 | DeLorme et al. |
| 6,339,746 B1 | 1/2002 | Sugiyama et al. |
| 6,374,182 B2 | 4/2002 | Bechtolsheim et al. |
| 6,381,535 B1 | 4/2002 | Durocher et al. |
| 6,381,538 B1 | 4/2002 | Robinson et al. |
| 6,415,226 B1 | 7/2002 | Kozak |
| 6,470,267 B1 | 10/2002 | Nozaki |
| 6,510,379 B1 | 1/2003 | Hasegawa et al. |
| 6,526,350 B2 | 2/2003 | Sekiyama |
| 6,542,811 B2 | 4/2003 | Doi |
| 6,553,313 B1 | 4/2003 | Froeberg |
| 6,567,743 B1 | 5/2003 | Mueller et al. |
| 6,571,216 B1 | 5/2003 | Garg et al. |
| 6,622,087 B2 | 9/2003 | Anderson |
| 6,636,145 B1 | 10/2003 | Murakami et al. |
| 6,640,187 B1 | 10/2003 | Chenault et al. |
| 6,687,608 B2 | 2/2004 | Sugimoto et al. |
| 6,697,730 B2 | 2/2004 | Dickerson |
| 6,711,474 B1 | 3/2004 | Treyz et al. |
| 6,721,654 B2 | 4/2004 | Akiyama |
| 6,778,903 B2 | 8/2004 | Robinson et al. |
| 6,785,607 B2 | 8/2004 | Watanabe et al. |
| 6,813,501 B2 | 11/2004 | Kinnunen et al. |
| 6,826,472 B1 | 11/2004 | Kamei et al. |
| 6,829,532 B2 | 12/2004 | Obradovich et al. |
| 6,847,889 B2 | 1/2005 | Park et al. |
| 6,865,482 B2 | 3/2005 | Hull |
| 6,871,137 B2 | 3/2005 | Scaer et al. |
| 6,898,517 B1 | 5/2005 | Froeberg |
| 6,952,559 B2 | 10/2005 | Bates et al. |
| 6,965,325 B2 | 11/2005 | Finnern |
| 6,993,326 B2 | 1/2006 | Link, II et al. |
| 7,016,307 B2 | 3/2006 | Vasudev et al. |
| 7,027,915 B2 | 4/2006 | Craine |
| 7,043,356 B2 | 5/2006 | Linn |
| 7,058,506 B2 | 6/2006 | Kawase et al. |
| 7,062,376 B2 | 6/2006 | Oesterling |
| 7,069,308 B2 | 6/2006 | Abrams |
| 7,076,409 B2 | 7/2006 | Agrawala et al. |
| 7,080,139 B1 | 7/2006 | Briggs et al. |
| 7,082,364 B2 | 7/2006 | Adamczyk |
| 7,092,819 B2 | 8/2006 | Odachi et al. |
| 7,103,368 B2 | 9/2006 | Teshima |
| 7,120,444 B2 | 10/2006 | Silvester |
| 7,149,625 B2 | 12/2006 | Mathews et al. |
| 7,196,639 B2 | 3/2007 | Joyce et al. |
| 7,212,919 B2 | 5/2007 | Chou et al |
| 7,221,928 B2 | 5/2007 | Laird et al. |
| 7,233,860 B2 | 6/2007 | Lokshin et al. |
| 7,239,960 B2 | 7/2007 | Yokota |
| 7,245,925 B2 | 7/2007 | Zellner |
| 7,250,907 B2 | 7/2007 | Krumm et al. |
| 7,286,837 B2 | 10/2007 | Giniger et al. |
| 7,295,805 B2 | 11/2007 | Walker |
| 7,308,236 B2 | 12/2007 | Fukushima |
| 7,376,414 B2 | 5/2008 | Engstrom |
| 7,403,905 B2 | 7/2008 | Shioda et al. |
| 7,466,986 B2 | 12/2008 | Halcrow et al. |
| 7,496,484 B2 | 2/2009 | Agrawala et al. |
| 7,512,487 B1 | 3/2009 | Golding |
| 7,522,995 B2 * | 4/2009 | Nortrup ................. 701/425 |
| 7,587,273 B2 | 9/2009 | Ohnishi et al. |
| 7,624,024 B2 | 11/2009 | Levis et al. |
| 7,627,414 B2 | 12/2009 | Goto et al. |
| 2001/0014849 A1 | 8/2001 | King et al. |
| 2001/0020211 A1 | 9/2001 | Takayama et al. |
| 2001/0025222 A1 | 9/2001 | Bechtolsheim et al. |
| 2001/0032121 A1 | 10/2001 | Le |
| 2001/0037271 A1 | 11/2001 | Kubota |
| 2001/0044321 A1 | 11/2001 | Ausems et al. |
| 2001/0044693 A1 | 11/2001 | Gotou et al. |
| 2001/0055165 A1 | 12/2001 | McCarthy |
| 2002/0004700 A1 | 1/2002 | Klein |
| 2002/0032035 A1 | 3/2002 | Teshima |
| 2002/0055872 A1 | 5/2002 | LaBrie |
| 2002/0084917 A1 | 7/2002 | Hauptman et al. |
| 2002/0091568 A1 | 7/2002 | Kraft et al. |
| 2002/0097193 A1 | 7/2002 | Powers |
| 2002/0107027 A1 | 8/2002 | O'Neil |
| 2002/0121981 A1 | 9/2002 | Munch |
| 2002/0124050 A1 | 9/2002 | Middeljans |
| 2002/0143464 A1 | 10/2002 | Blewitt |
| 2002/0169540 A1 | 11/2002 | Engstrom |
| 2002/0184091 A1 | 12/2002 | Pudar |
| 2003/0023371 A1 | 1/2003 | Stephens |
| 2003/0043045 A1 | 3/2003 | Yasushi |
| 2003/0093216 A1 | 5/2003 | Akiyama |
| 2003/0135304 A1 | 7/2003 | Sroub et al. |
| 2003/0158650 A1 | 8/2003 | Abe et al. |
| 2003/0182183 A1 | 9/2003 | Pribe |
| 2004/0076279 A1 | 4/2004 | Taschereau |
| 2004/0088392 A1 | 5/2004 | Barrett et al. |
| 2004/0117195 A1 | 6/2004 | Bodin |
| 2004/0117246 A1 | 6/2004 | Applebaum |
| 2004/0143496 A1 | 7/2004 | Saenz |
| 2004/0158433 A1 | 8/2004 | Wimschneider et al. |
| 2004/0204848 A1 | 10/2004 | Matsuo et al. |
| 2004/0233045 A1 | 11/2004 | Mays |
| 2005/0085997 A1 | 4/2005 | Park |
| 2005/0125148 A1 | 6/2005 | Van Buer et al. |
| 2005/0132024 A1 | 6/2005 | Habaguchi et al. |
| 2005/0140524 A1 | 6/2005 | Kato et al. |
| 2005/0165762 A1 | 7/2005 | Bishop |
| 2005/0197764 A1 | 9/2005 | Wolf |
| 2005/0198287 A1 | 9/2005 | Sauve et al. |
| 2005/0216182 A1 | 9/2005 | Hussain et al. |
| 2005/0267651 A1 | 12/2005 | Arango |
| 2006/0041500 A1 | 2/2006 | Diana et al. |
| 2006/0053038 A1 | 3/2006 | Warren et al. |
| 2006/0058947 A1 | 3/2006 | Schalk |
| 2006/0074531 A1 | 4/2006 | Saarinen et al. |
| 2006/0095374 A1 | 5/2006 | Lo |
| 2006/0123053 A1 | 6/2006 | Scannell |
| 2006/0129313 A1 * | 6/2006 | Becker et al. .................. 701/202 |
| 2006/0143183 A1 | 6/2006 | Goldberg et al. |
| 2006/0190168 A1 | 8/2006 | Ohnishi et al. |
| 2006/0218225 A1 | 9/2006 | Hee Voon et al. |
| 2006/0235739 A1 | 10/2006 | Levis et al. |
| 2006/0241859 A1 | 10/2006 | Kimchi et al. |
| 2006/0241862 A1 | 10/2006 | Ichihara et al. |
| 2006/0247852 A1 | 11/2006 | Kortge |
| 2006/0265119 A1 | 11/2006 | McMahan et al. |
| 2006/0270421 A1 | 11/2006 | Phillips et al. |
| 2006/0291396 A1 | 12/2006 | Hamilton et al. |
| 2007/0005233 A1 | 1/2007 | Pinkus et al. |
| 2007/0016362 A1 | 1/2007 | Nelson |
| 2007/0027593 A1 | 2/2007 | Shah et al. |
| 2007/0032947 A1 | 2/2007 | Yamada et al. |
| 2007/0050240 A1 | 3/2007 | Belani et al. |
| 2007/0050248 A1 | 3/2007 | Huang et al. |
| 2007/0050279 A1 | 3/2007 | Huang et al. |
| 2007/0061057 A1 | 3/2007 | Huang et al. |
| 2007/0061838 A1 | 3/2007 | Grubbs et al. |
| 2007/0073480 A1 | 3/2007 | Singh |
| 2007/0073841 A1 | 3/2007 | Ryan et al. |
| 2007/0078729 A1 | 4/2007 | Brown |
| 2007/0093258 A1 | 4/2007 | Steenstra et al. |
| 2007/0100805 A1 | 5/2007 | Ramer et al. |
| 2007/0106465 A1 | 5/2007 | Adam et al. |
| 2007/0106468 A1 | 5/2007 | Eichenbaum et al. |
| 2007/0128900 A1 | 6/2007 | Bauman |
| 2007/0129082 A1 | 6/2007 | Thacher |
| 2007/0146200 A1 | 6/2007 | Norin et al. |
| 2007/0156326 A1 | 7/2007 | Nesbitt |
| 2007/0176796 A1 | 8/2007 | Bliss et al. |
| 2007/0203644 A1 | 8/2007 | Thota et al. |
| 2007/0208495 A1 | 9/2007 | Chapman et al. |
| 2007/0210937 A1 | 9/2007 | Smith et al. |
| 2007/0218900 A1 | 9/2007 | Abhyanker |
| 2007/0219717 A1 | 9/2007 | Chang |
| 2007/0244627 A1 | 10/2007 | Boss et al. |
| 2007/0250259 A1 | 10/2007 | Dare |
| 2007/0257792 A1 | 11/2007 | Gold |
| 2007/0293958 A1 | 12/2007 | Stehle et al. |
| 2008/0015763 A1 | 1/2008 | Kitazaki et al. |
| 2008/0033644 A1 | 2/2008 | Bannon |
| 2008/0046134 A1 | 2/2008 | Bruce et al. |

| | | | |
|---|---|---|---|
| 2008/0046165 | A1 | 2/2008 | Downs et al. |
| 2008/0200312 | A1 | 8/2008 | Tagliabue |
| 2008/0293430 | A1 | 11/2008 | Blom et al. |
| 2008/0312819 | A1 | 12/2008 | Banerjee |
| 2009/0005973 | A1 | 1/2009 | Salo |
| 2009/0012703 | A1 | 1/2009 | Aso et al. |
| 2009/0048771 | A1 | 2/2009 | Speier et al. |
| 2009/0082917 | A1 | 3/2009 | Adachi |
| 2010/0036610 | A1 | 2/2010 | Urciuoli et al. |

FOREIGN PATENT DOCUMENTS

| | | | |
|---|---|---|---|
| JP | 2002156234 | A | 5/2002 |
| KR | 1020060016832 | A | 2/2006 |
| WO | WO0002389 | A1 | 1/2000 |
| WO | WO0108413 | A1 | 2/2001 |
| WO | 03042950 | A1 | 5/2002 |
| WO | WO0239367 | A1 | 5/2002 |
| WO | 03019478 | A1 | 3/2003 |
| WO | WO03063521 | A2 | 7/2003 |
| WO | WO2004084437 | A1 | 9/2004 |
| WO | 2005024667 | A1 | 3/2005 |
| WO | 2007131225 | A2 | 11/2007 |

OTHER PUBLICATIONS

Design and Implementation of Location-Based Wireless Targeted Advertising, Proc. SPIE vol. 4586, p. 291-297, Wireless and Mobile Communications. http://adsabs.harvard.edu/abs/2001SPIE.4586..291L. Last accessed Oct. 5, 2007, 2 pages.
Toshihiro Osaragi, et al. Map Element Extraction Model for Pedestrian Route Guidance Map http://ieeexplore.ieee.org/xpl/freeabs_all.jsp?arnumber=1532626. Last accessed Oct. 3, 2007, 10 pages.
S. P. Hoogendoorn, et al. Pedestrian Route-Choice and Activity Scheduling Theory and Models, Transportation Research Part B 38 (2004) 169-190, doi:10.1016/S0191-2615(03)00007-9, Elsevier Ltd. The Netherlands. http://www.pedestrians.tudelft.nl/publications/Tr%20B%2004%20rc.pdf. Last accessed Oct. 3, 2007, 22 pages.
Alexandra Millonig, et al. Developing Landmark-Based Pedestrian Navigation Systems, Digital Object Identifier 10.1109/TITS.2006.889439, 1524-9050, IEEE Transactions on Intelligent Transportation Systems, vol. 8, No. 1, Mar. 2007. http://ieeexplore.ieee.org/xpl/freeabs_all.jsp?arnumber=1520046. Last accessed Oct. 3, 2007, 7 pages.
Srihari Narsimhan, et al. Methods for Optimal Pedestrian Task Scheduling and Routing http://www.cs.nott.ac.uk/~rxq/PlanSIG/narasimhan.pdf. Last accessed Oct. 3, 2007, 8 pages.
Gunther Retscher, et al. Navio—A Navigation and Guidance Service for Pedestrians. Journal of Global Positioning Systems (2004), vol. 3, No. 1-2: 208-217 http://www.gmat.unsw.edu.au/wang/jgps/v3n12/v3n12p26.pdf. Last accessed Oct. 3, 2007, 10 pages.
About Amaze, 2000-2007 LocatioNet Systems Ltd http://www.amazegps.com/docs/amAze_UM_en%203.1.pdf. Last accessed Oct. 4, 2007, 37 pages.
Route 66 Mobile 7 for Nokia Series 60 Mobile Phones Launched in North America, Dec. 8, 2005, St. Louis, MO. http://www.66.com/route66/news.php?cid=US&sec=0&ssec=9&news=555. Last accessed Oct. 4, 2007, 2 pages.
Vijoy Pandey, et al. Exploiting User Profiles to Support Differentiated Services in Next-Generation Wireless Networks. Jul. 15, 2002 http://networks.cs.ucdavis.edu/—ghosal/Research/publications/vijoy-profiling-network-magazine.pdf. Last accessed Oct. 4, 2007, 23 pages.
Non-Final Office Action mailed Aug. 17, 2010 in U.S. Appl. No. 12/033,690.
Final Office Action mailed Feb. 1, 2011 in U.S. Appl. No. 12/033,690.
Non-Final Office Action mailed Aug. 17, 2010 in U.S. Appl. No. 12/033,652.
Final Office Action mailed Mar. 18, 2011 in U.S. Appl. No. 121033,652.
Non-Final Office Action mailed Aug. 23, 2010 in U.S. Appl. No. 11/957,210.
Final Office Action mailed Dec. 13, 2010 in U.S. Appl. No. 11/957,210.
Non-Final Office Action mailed Nov. 1, 2010 in U.S. Appl. No. 11/957,182.
Final Office Action mailed Feb. 14, 2011 in U.S. Appl. No. 11/957,182.
Non-Final Office Action mailed Nov. 19, 2010 in U.S. Appl. No. 11/957,206.
Non-Final Office Action mailed Mar. 8, 2011 in U.S. Appl. No. 11/957,115.
Non-final Office Action mailed Mar. 25, 2011 in U.S. Appl. No. 11/957,219.
International Search Report with Written Opinion dated Aug. 24, 2009 (PCT/US2009/030377).
International Search Report with Written Opinion dated Aug. 24, 2009 (PCT/US2009/030380).
International Search Report with Written Opinion dated Jun. 29, 2009 (PCT/US2008/083543).
International Search Report with Written Opinion dated Jun. 22, 2009 (PCT/US2008/083538).
Mapquest Business Solutions Advantage APITM http://cdn.mapquest.com/corpb2b/bsolutions-advantageapi-pdf-whitepaper.pdf. Last accessed Oct. 4, 2007, 22 pages.
Route Guidance 'That Won't Replace One Jam with Another', m.logistics, Man/Jun. 2005, Issue 17. http://www.mlogmag.com/magazine/17/route-guidance.shtml. Last accessed Oct. 4, 2007, 3 pages.
New Magellan (Thales) MAESTRO4000 Vehicle Navigation System http://cgi.ebay.com/New-MAESTRO4000-Vehicle-Navigation-System-980919-01_W0QQitemZ110163915037QQihZ001QQ category Z73332QQcmdZViewItem. Last accessed Oct. 4, 2007, 5 pages.
Moshe Ben-Akiva, et al. Development of a Route Guidance Generation System for Real-Time Application http://rosowww.epfl.ch/mbi/papers/chania.pdf. Last accessed Apr. 10, 2007, 6 pages.
W. -T. Balke, et al. A Situation-aware Mobile Traffic Information System http://www.I3s.de/~balke/paper/hicss03.pdf. Last accessed Apr. 10, 2007, 10 pages.
Keri Schreiner. Where We At? Mobile Phones Bring GPS to the Masses, May/Jun. 2007, Published by the IEEE Computer Society, 0272-1716/07 http://www.computer.org/portal/cms_docs_cga/cga/content/Promo/g3006_07.pdf. Last accessed Oct. 4, 2007, 6 pages.
Alan Mislove, et al. Exploiting Social Networks for Internet Search http://www.mpi-sws.mpg.de/~amislove/publications/PeerSpective-HotNets.pdf. Last accessed Oct. 3, 2007, 6 pages.
Sergi Marti, et al. DHT Routing Using Social Links. http://iptps04.cs.ucsd.edu/papers/marti-social.pdf. Last accessed Oct. 3, 2007, 6 pages.
Antonio Kruger, et al. The Connected User Interface: Realizing a Personal Situated Navigation Service. IUI'04, Jan. 13-16, 2004, Madeira, Funchal, Portugal. ACM 1-58113-815-6104/0001 www.medien.ifi.lmu.de/pubdb/publications/pub/butz2004userinterface/butz2004userinterface.pdf. Last accessed Oct. 3, 2007, 8 pages.
Managing Demand Through Travel Information Services, U.S. Department of Transportation, Federal Highway Administration http://ops.fhwadot.gov/publications/manag_demand_tis/travelinfo.htm. Last accessed Oct. 3, 2007, 33 pages.
Boualem Benatallah, et al. OCEAN—Scalable and Adaptive Infrastructure for On-board Information Access, UNSW-CSE-TR-0601, Jan. 2006. http://www.cse.unsw.edu.au/~llibman/papers/unsw601.pdf. Last accessed Oct. 3, 2007, 14 pages.
N. Hristova, et al. Ad-Me: A Context-Sensitive Advertising System http://www.cs.ucd.ie/csprism/publications/Ericsson-UCD/HriAdme01ii.pdf. Last accessed Oct. 3, 2007, 10 pages.
Alessandra Agostini, et al. Integrated Profile Management for Mobile Computing http://webmind.dico.unimi.it/papers/AI2IA.pdf. Last accessed Oct. 3, 2007, 5 pages.
"iCarpool http://www.icarpool.com/enlTransportationPlanner.htm. Last accessed Dec. 11, 2007, 2 pages."
"Ecolane Dynamic CarpoolTM, Ecolane Finland Oy 2006. http://www.ecolane.com/services/carpool/index.html. Last accessed Dec. 11, 2007, 1 page."
"Route Planner, vol. 3—Modules, (Route Planner—Sep. 6, 2002—LA-UR-00/1767—Transims 3.0). http://ndssl.vbi.v1.edu/PublicationsITransimsVol3Ch4.pdf. Last accessed Dec. 11, 2007, 60 pages."

"Meredith Williams. Reduce Stress and Stay Organized While Running Errands http://www.microsoft.com/athome/intouch/directions.mspx. Last accessed Dec. 11, 2007, 3 pages."

"TomTom Itinerary Planning http://www.gpsreview.netltomtom-itinerary-planning/. Last accessed Dec. 11, 2007, 12 pages."

"Pilot Tests of Dynamic Ridesharing, updated Jan. 23, 2007. http://www.ridenow.org/ridenow_summary.html. Last accessed Dec. 11, 2007, 35 pages."

Goncalo Correia, et al. Car Pooling Clubs: Solution for the Affiliation Problem in Traditional/Dynamic Ridesharing Systems http://www.iasi.cnr.itlewgtl16conference/ID92.pdf. 6 pages.

Atlanta Unveils Traffic Reduction Plan, posted Aug. 28, 2007. http://www.environmentaldefense.org/article .cfm?contentl 0=6812. Last accessed Dec. 11, 2007, 1 page.

James Baring. The Solution to the Traffic Congestion Problem, Dec. 1, 2006. http://revelstoke.org.uklgsmpccs.htm. Last accessed Dec. 11, 2007, 5 pages.

Martin O'Hara. Automated Congestion Charge Payment Scheme Using Smartnav Intellifgent Satellite Navigation System, Apr. 13, 2005. Last accessed Dec. 11, 2007, 7 pages. http://www.tridatacom.co. ukiDownloads/papers/Papers/RI N%20Congestion%20 130405.pdf.

Lisa J. Molnar, et al. Developing Information Systems for the Driving Tourist: A Literature Review, Feb. 1996. http://66.1 02.1.1 04/scholar?hl=en&lr=&q=cache:GJzx9CvxhCQJ:sambuca.umdl.umich.edu:80801/handle/2027.42/1160. Last accessed Dec. 11, 2007, 81 pages.

Federal Highway Administration FHWA Domestic Pedestrian Safety Scanning Tour, Sep. 2005 http://66. 1 02.1 .1 04/scholar?h l=en&lr=&q=cache :3cGz2QG EKH kJ :www.cdtcmpo.org/bike/pedsafety.pdf. Last D accessed Dec. 11, 2007, 64 pages.

Christine M. Johnson. The National ITS Program: Where We've Been and Where We're Going http://66.1 02.1.1 04/scholar?hl=en&lr=&q=cache:flK6zDerzTQJ:plan20p. fhwa.dol.gov/pdfs/Pdfl/Edl03531.pdf. Last D accessed Dec. 11, 2007, 12 pages.

Mohamed A. Abedel-Aty, et al. Impact of ATIS on Drivers' Decisions and Route Choice: A Literature Review, University of California, Davis. UCB-ITS-PRR-93-11, Sep. 1993, ISSN 10551425 http://repositories.cdlib.org/cgi/viewcontenl.cgi?article=1254&context=its/path. Last accessed Dec. 7, 2007, 48 pages.

Modelling the impact of incentives on route choice and traffic safety using a route choice simulator experiment http://www.aida.utwente.nl/NieuwsNacancLAIDA-STOK_pilol.whlinkl. Last accessed 12110/07,7 pages.

"Field Service Route Optimization for Energy and Cost Efficiency" http://www.californiagreensolutions.com/cgi-bin/glltpl.h,content=381. Last accessed Dec. 10, 2007, 2 pages.

Franziska Klugl, et al. Route Decision Behaviour in a Commuting Scenario: Simple Heuristics Adaptation and Effect of Traffic Forecast. Journal of Artificial Societies and Social Simulation vol. 7, No. 1. Published: Jan. 31, 2004. http://jasss.soc.surrey.ac.ukl71111.html. Last accessed Dec. 11, 2007, 21 pages.

Non-Final Office Action mailed Mar. 29, 2011 in U.S. Appl. No. 12/033,627.

Non-Final Office Action mailed Mar. 30, 2011 in U.S. Appl. No. 11/957,188.

Non-Final Office Action mailed Mar. 30, 2011 in U.S. Appl. No. 11/957,167.

Non-Final Office Action mailed Jun. 13, 2011 in U.S. Appl. No. 12/033,690.

Non-Final Office Action mailed May 27, 2011 in U.S. Appl. No. 11/957,139.

Final Office Action mailed Apr. 21, 2011 in U.S. Appl. No. 11/957,206.

Non-Final Office Action mailed May 3, 2011 in U.S. Appl. No. 11/957,210.

Non-Final Office Action mailed Jul. 21, 2011 in U.S. Appl. No. 11/957,139.

Non-Final Office Action mailed Aug. 29, 2011 in U.S. Appl. No. 11/957,115.

Non-Final Office Action mailed Aug. 9, 2011 in U.S. Appl. No. 12/033,652.

Non-Final Office Action mailed Aug. 23, 2011 in U.S. Appl. No. 11/957,206.

Notice of Allowance mailed Aug. 24, 2011 in U.S. Appl. No. 11/957,182.

Broadhurst, et al., Monte Carlo Road Safety Reasoning, presented at the IEEE Intelligent Vehicle Symposium (IV2005), IEEE.

Non-Final Office Action mailed Sep. 28, 2011 in U.S. Appl. No. 11/957,219.

Final Office Action mailed Sep. 14, 2011 in U.S. Appl. No. 12/033,627.

Non-Final Office Action mailed Oct. 6, 2011 in U.S. Appl. No. 11/957,151.

Final Office Action mailed Dec. 1, 2011 in U.S. Appl. No. 12/033,690.

Final Office Action mailed Nov. 16, 2011 in U.S. Appl. No. 11/957,188.

Final Office Action mailed Dec. 22, 2011 in U.S. Appl. No. 11/957,206.

Notice of Allowance mailed Oct. 27, 2011 in U.S. Appl. No. 11/957,210.

Non-Final Office Action mailed May 15, 2012 in U.S. Appl. No. 11/957,206, 10 pages.

Final Office Action mailed Jan. 24, 2012 in U.S. Appl. No. 11/957,219, 5 pages.

Final Office Action mailed Feb. 1, 2012 in U.S. Appl. No. 12/033,652, 34 pages.

Non-Final Office Action mailed Mar. 28, 2012 in U.S. Appl. No. 12/033,627, 12 pages.

Final Office Action mailed Jan. 13, 2012 in U.S. Appl. No. 11/957,139, 16 pages.

Final Office Action mailed Apr. 12, 2012 in U.S. Appl. No. 11/957,151, 15 pages.

* cited by examiner

FEDERATED ROUTE PRODUCTION

CROSS-REFERENCE

This application relates to U.S. patent application draft with Ser. No. 11/957,115 entitled "ROUTE MONETIZATION".

This application relates to U.S. patent application draft with Ser. No. 11/957,139 entitled "DESTINATION AUCTIONED THROUGH BUSINESS OF INTEREST".

This application relates to U.S. patent application draft with Ser. No. 11/957,151 entitled "GENERATIONAL INTELLIGENT NAVIGATION MANIPULATION".

This application relates to U.S. patent application draft with Ser. No. 11/957,167 entitled "SOCIAL NETWORK BASED ROUTES".

This application relates to U.S. patent application draft with Ser. No. 11/957,182 entitled "ROUTE TRANSFER BETWEEN DEVICES".

This application relates to U.S. patent application draft with Ser. No. 11/957,188 entitled "ADDITIONAL CONTENT BASED ON INTENDED TRAVEL DESTINATION".

This application relates to U.S. patent application draft with Ser. No. 11/957,206 entitled "AUTOMATIC SPLICES FOR TARGETED ADVERTISEMENTS".

This application relates to U.S. patent application draft with Ser. No. 11/957,210 entitled "PEDESTRIAN ROUTE PRODUCTION".

This application relates to U.S. patent application draft with Ser. No. 11/957,219 entitled "ROUTE GENERATION BASED UPON ACTIVITY CRITERIA".

TECHNICAL FIELD

The subject specification relates generally to traffic routing and in particular to providing a route with details from a number of sources.

BACKGROUND

Computer-driven route planning applications are utilized to aid users in locating points of interest, such as particular buildings, addresses, and the like. Additionally, in several existent commercial applications, users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a municipality, state/providence, and/or country, proximity of the point of interest to major freeways, proximity of the point of interest to a specific city, and the like.

Furthermore, conventional computer-implemented mapping applications often include route-planning applications that can be utilized to provide users with directions between different locations. Pursuant to an example, a user can provide a route planning application with a beginning point of travel and an end point of travel (e.g., beginning and ending addresses). The route planning application can include or utilize representations of roads and intersections and one or more algorithms to output a suggested route of travel. These algorithms can output routes depending upon user-selected parameters. For instance, a commercial route planning application can include a check box that enables a user to specify that she wishes to avoid highways. Similarly, a user can inform the route planning application that she wishes to travel on a shortest route or a route that takes a least amount of time (as determined by underlying algorithms). Over the last several years, individuals have grown to rely increasingly on route planning applications to aid them in everything from locating a friend's house to planning cross-country road trips.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventionally, travel routes are generated using a main database of information. For instance, a user can access an Internet mapping web site and enter a starting point and an intended destination. The web site accesses a central database that holds maps, traffic information, weather data, etc. Based upon details from the central database, a direction set is constructed between the starting point and the intended destination. There are several deficiencies that become apparent in using conventional route generation—database information is not up-to-date, routes are generated in advance of travel such that changes cannot be easily made during travel, etc.

The disclosed innovation supplements a route with information from a source with alternate information. A route can be initially generated and as a user approaches an established area, the route can be augmented with improved information. For instance, when a user approaches a metropolitan area, up-to-date routes and traffic patterns can be used to alter the route. A gather component obtains information from a supplemental source and a selection component determines if the route should be augmented with at least some of the obtained information. In addition to route modification, maps (e.g., directional placements without specific directional instructions) can be altered though practice of aspects disclosed in the subject specification.

Conventional improvements to traffic routing have focused on improving the quality of a database used to generate a route. A large market share has been dominated by central database advancements and little attention has been paid to altering a route through use of supplemental sources. Implementation of the disclosed innovation can produce an unexpected result that routes can be as good as, if not better than, routes generated from a solitary database.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
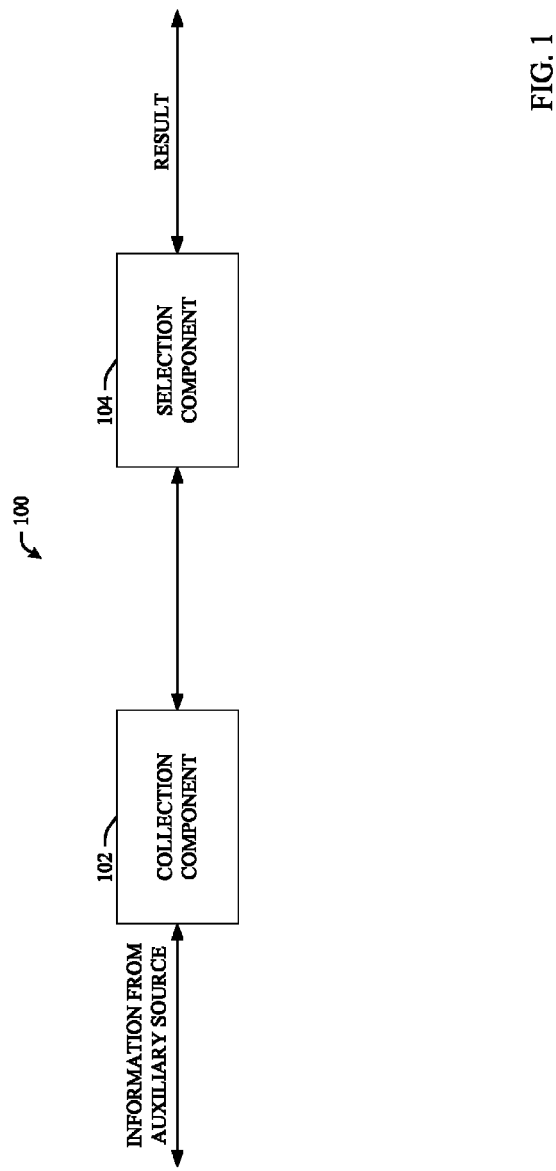
FIG. 1 illustrates a representative route augmentation information selection system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. When a component, unit, module, etc. makes an inference or determination, it is to be appreciated that the inference or determination can be performed through utilization of artificial intelligence techniques.

Referring now to FIG. 1, a system 100 is disclosed for selecting if a route should be augmented based upon supplemental information. Commonly, a route is generated at a home computer or through utilization of a navigation system (e.g., portable, in-vehicle, as part of another device such as a cellular telephone, etc.). When generating the route, a central database is contacted (e.g., locally, remotely, etc.) and the route is constructed based upon central database information. The disclosed innovation allows the route to be modified by information from various locations.

A collection component 102 obtains information from an auxiliary source, such as a company database, municipality broadcasting entity, etc. Example information includes route solution data, street and building information, and the like. The system 100 can be implemented upon a vehicle (e.g., automobile, motorcycle, bicycle, airplane, helicopter, motorboat, self-balancing transportation device, etc.) to assist in route alteration. A detection mechanism can be implemented that enables discovery of sources capable of supplying information that can be used for route augmentation. If a discovery is made, then the collection component 102 can gather relevant information from the source. In another embodiment, information can be broadcast by auxiliary sources (e.g., over radio frequencies) and the collection component 102 obtains information from the broadcast.

Obtained information is analyzed by a selection component 104 such that a decision can be made concerning route augmentation. The selection component 104 resolves if information from the auxiliary source should augment a route generated through utilization of a primary source. Choosing data from the auxiliary source for use in direction set alteration can be performed by the selection component 104 if the resolution is concluded with a positive answer (e.g., a change should take place). If a negative answer is an outcome of selection component resolution, then an original route can remain unchanged.

According to one embodiment, the collection component 102 can obtain information from systems similar to the system 100 (e.g., directly from other systems, from a central server, etc.). Based upon the response of other systems, operation of the collection component 102 or selection component 104 can be modified. For example, an auxiliary source can provide poor information to a number of different systems and the systems can signify that the information was of poor quality. The selection component 104 can use the history of other systems in determining if a change should be made based on information from the poor quality source (e.g., since information was poor in other instances, then information should not be used to make an alteration). Moreover, history specific to a user can be taken into account for route augmentation. For instance, if a user has a positive reaction along a path, then it can become more difficult (e.g., a higher standard is to be met) for the path to be replaced (e.g., augmenting the route with a different path). In addition, tendencies of a user can be taken into account; if a user enjoys shopping, then it can become more difficult (e.g., a higher standard is to be met) for the path taking a user past a shopping mall to be replaced with a path that does not include a shopping mall.

The collection component 102 can function such that obtained information can be a route solution. For instance, a request can be made taking a user from an entrance gate to her desk and her company can respond with a route solution (e.g., the route solution functions as obtained data). The route solution can include directions to reach her desk, but exclude floorplans for buildings she passes or a floorplan of her office building. The selection component 104 can augment a route by deleting a route portion and/or stitching in a route solution obtained by the collection component 102.

The following is an example of an implementation of the system 100 used in a vehicle. The collection component 102 can gather a route constructed off an Internet map generation web site and hold the route in flash memory. The route can take a user from her home to a business campus with many roads, buildings, etc. As the user approaches the campus, the collection component 102 can request for updated information from a server located upon the business campus—the request can include route information, traffic information, accidents, demographic data, etc. The server can supply information that a road the user plans on taking is closed and a detour is suggested. The selection component 104 can analyze the information and determine that the detour information should be augmented onto the original route. A result is outputted from the selection component 104 with appropriate information (e.g., information to make the change) and transferred to a component capable of making an appropriate change. While being disclosed as taking place at a time later then route generation, it is to be appreciated that aspects of the subject specification can take place prior to, concurrent with, or after initial route generation actions.

While the collection component 102 and selection component 104 are directed toward route augmentation, it is to be appreciated that they can be utilized to augment a map without directional instructions. The collection component 102 can obtain information from an auxiliary source. The selection component 104 can resolve if information from the auxiliary source should augment a map generated through utilization of a primary source. Aspects of other components disclosed in the subject specification can be directed to map alteration in addition to route alteration.

Figure 2:
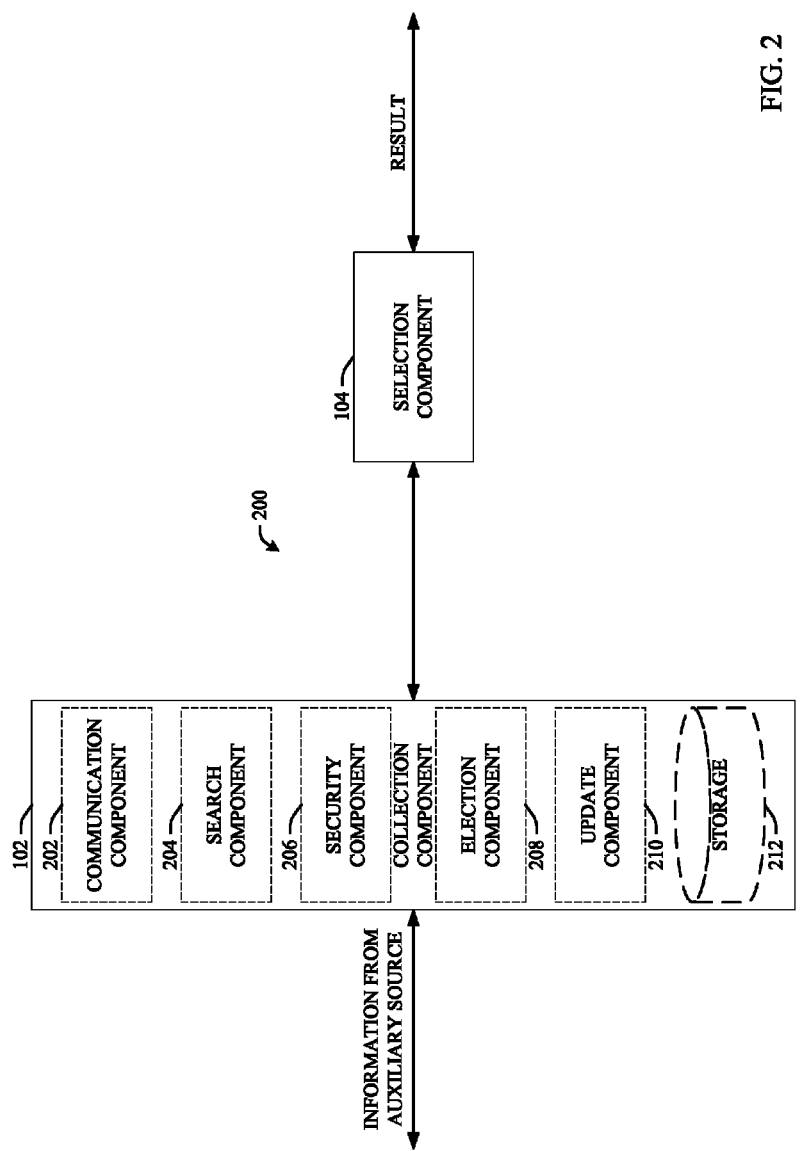
FIG. 2 illustrates a representative route augmentation information selection system with a detailed collection component in accordance with an aspect of the subject specification.

Now referring to FIG. 2, a system 200 is disclosed highlighting various possible aspects related to the collection component 102. A communication component 202 can engage with other devices to transfer information, such as to send a request for information, receiving information from an auxiliary source, etc. Operation can take place wirelessly, in a hard-wired manner, employment of security technology (e.g., encryption), etc. Moreover, the communication component 202 can utilize various protective features, such as performing a virus scan on obtained data and blocking information that is positive for a virus. The communication can be active, e.g., request—answer, or passive e.g., monitoring broadcasted data flow.

The communication component 202 can be utilized by a search component 204 that locates an auxiliary source or information produced by the auxiliary source. A continuous scan can be performed by the search component 204 to located sources of information that have a potential to be relevant in route augmentation. The search component 204 can initiate a request to an auxiliary source to provide relevant information if an auxiliary source is located. In addition, the search component 204 can monitor various channels to determine information that is relevant toward route augmentation. For instance, the search component 204 can recognize that a vehicle operating the system 200 has entered a new city and perform a check if updated road construction information is available. According to one embodiment, the search component 204 can access a remote catalog, where federated services (e.g., a municipality offering a map) can advertise available maps in the catalog.

Often times, auxiliary sources can configure to be reluctant to provide information to a user. For instance, a military instillation can be hesitant to provide detailed maps to any requesting user. A security component 206 can determine if an auxiliary source desires authentication and provide appropriate metadata (e.g., a username and password) to the auxiliary source. An auxiliary source can validate the system 200 (e.g., through analyzing the metadata) and provide map information to the security component 206 based upon a successful validation. If map information is not provided (e.g., due to unsuccessful validation) or a portion of requested map information is provided, then the security component 206 can determine if another source can provide similar information and attempt to gain data from the similar source. Therefore, the security component 206 can engage the auxiliary source such that the auxiliary source is able to validate a request for the information obtainment.

It is possible that multiple sources can have relevant information that is conflicting and/or inconsistent; to manage these situations, an election component 208 can designate an auxiliary source from which to use information from a plurality of auxiliary sources. In an illustrative example, a vehicle can enter a new city as well as a new county at one time—a county government and city government produce independent maps on traffic patterns. The election component 208 can determine which map (e.g., city or county) should be used in route augmentation. This can limit information transferred to the selection component 104 and thus conserve system resources (e.g., improve processing time). The election component 208 can also configure to merge information together from multiple sources. For instance, major street information from the county map can be merged with other street information from the city map to create a hybrid map. Various factors can be used in selecting a map, such as user input, community reviews, veracity of information, personal history, etc. Elections can take place at other times, such as implementing as part of selection component operation.

Information from auxiliary sources can be used to modify a primary source through an update component 210 that alters information in the primary source based upon information obtained from the auxiliary source. A user can enter into a remote area upon which a primary source has little information. Upon entering the area, the collection component 102 can obtain information on roads, terrain, traffic, etc. The update component 210 can prepare a revision for a database that produced an initial route and transmit the revision through utilization of the communication component 202. The update component 210 can utilize other information, such as if the data is ultimately chosen by the selection component 104 before determining if a revision is appropriate.

Different pieces of information, such as a personal profile, an original route, etc. can be held on storage 212. Storage 212 can arrange in a number of different configurations, including as random access memory, battery-backed memory, hard disk, magnetic tape, etc. Various features can be implemented upon storage 212, such as compression and automatic back up (e.g., use of a Redundant Array of Independent Drives configuration). Output of the collection component 102 (e.g., route information obtained from an auxiliary source) transfers to a selection component 104 that resolves if information from the auxiliary source should augment a route generated through utilization of a primary source.

Figure 3:
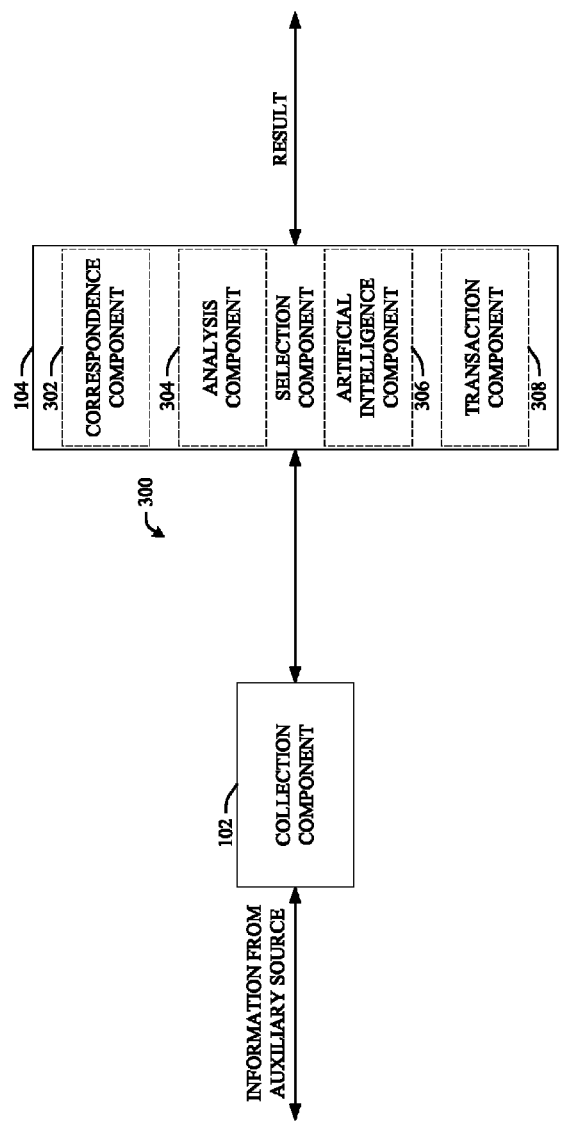
FIG. 3 illustrates a representative route augmentation information selection system with a detailed selection component in accordance with an aspect of the subject specification.

Now referring to FIG. 3, a system 300 is disclosed highlighting various possible aspects related to the selection component 104. Commonly, information is initially gathered from an auxiliary source through use of a collection component 102. The collection component 102 can perform various processes upon the information and transfer at least part of the information to the selection component 104.

A correspondence component 302 can engage with other devices in information transfer. Operation can take place wirelessly, in a hard-wired manner, employment of security technology (e.g., encryption), etc. Moreover, the correspondence component 302 can utilize various protective features, such as performing a virus scan on obtained data and blocking information that is positive for a virus.

Information obtained by the collection component 102 can be processed by an analysis component 304 that evaluates the obtained information. Example evaluations can include quality of information (e.g., information is of higher or lower detail than a generated route), reliability of information (e.g., information is provided by a for-profit company that can have an ulterior motive), accuracy of information (e.g., in a traffic example, time since statistics were taken). According to one embodiment, the analysis component 304 can employ a statistical table that enables relatively easy resolution. Comparisons, checks, weights, metrics, historical data, and the like can be used to provide values for information. For instance, information can be given a high score if a recording is recent; however, the score can be lowered if the information is supplied by a for-profit company. In an example resolution illustration, if information has an overall positive score, then it is used to augment a route, while if information has a neutral or negative score, then it is not used.

An artificial intelligence component 306 can make at least one inference or at least one determination in relation to the information obtainment or information augmentation resolution, commonly based upon evaluation results. For instance, vehicle sensors (e.g., of a vehicle operating the system 300) can determine the vehicle is moving relatively slowly as compared to a speed limit. In addition, routes with traffic information from a secondary source can be collected by the system 300. The artificial intelligence component 306 can infer that a user wants a different route (e.g., due to the observed slow speed) and determines that the route should be modified through collected information. The artificial intelligence component 306 can operate in conjunction with the collection component 102, such as determining if a located source is reliable and inferring if a user has authorization to view information (e.g., through analysis of a personal profile).

Artificial intelligence component 306 can employ one of numerous methodologies for learning from data and then drawing inferences and/or creating making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems. The artificial intelligence component 306 can make a determination if information from an auxiliary source is to be used to augment a route.

While the artificial intelligence component 306 can configure to perform complex actions, it is to be appreciated actions can be performed. For instance, a database originally generating a direction set can have a hole, such as traveling through a private business campus. A single provider can be contacted (e.g., a main server of the business campus) and the provider can supply missing map information. Provided map information can be integrated into an existing map with little to no extra evaluation.

Use of information towards augmentation can be subject to financial/reward constraints that are processed by a transaction component 308 that performs a fiscal operation in relation to the information obtainment or the information augmentation resolution. An entity can require payment for providing information, for using information to update a central database, to augment a route, etc. The transaction component 308 can perform actions to meet constraints, such as debiting a user account and crediting a provider account. While fiscal amounts are commonly transacted, it is to be appreciated that other commodities can be exchanged, such as coupons, meeting of contractual obligations (e.g., canceling of debts), tax credits, etc. In addition, the transaction component 308 can perform a reward function concerning primary source alteration. For example, a user account can be increased with credits for future route generation from a central server for providing an update (e.g., current speed, or traffic information, etc.). The selection component 104 can output a result, commonly if information should be used to augment a route or an augmentation that should take place.

According to an alternate embodiment, the system 300 can perform little processing, while a large amount of calculations are performed by the auxiliary source. For instance, a route can be generated using a conventional map database (e.g., primary source) and the communication component 202 of FIG. 2 can transfer the route to an auxiliary source. The auxiliary source can change route information based upon local map information and the changed route can be obtained by the collection component 102 (e.g., the changed route is obtained information.) The selection component 104 resolves if information from the auxiliary source should augment a route generated through utilization of a primary source by determining if the changed route should replace an original route for presentment.

Figure 4:
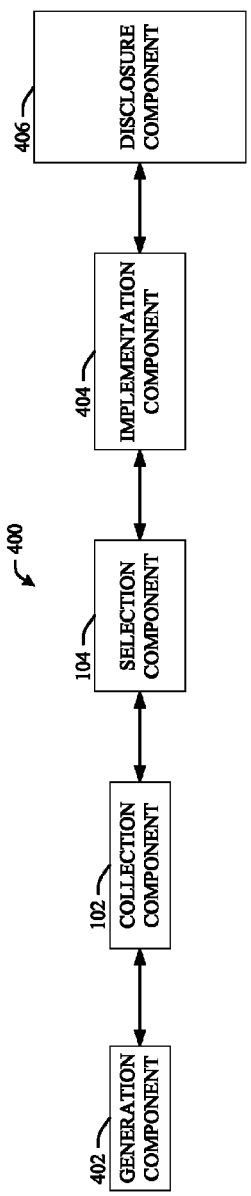
FIG. 4 illustrates a representative route production system in accordance with an aspect of the subject specification.

Now referring to FIG. 4, a system 400 is disclosed that can create and augment a route as well as present the route to a user. A generation component 402 can produce a route from a primary source, such as a map database. For example, the generation component 402 can produce a route through pre-destination. A user can have a habit of traveling from her home to her office during weekdays at morning hours. The generation component 402 can construct a route based upon previous engagements of the user held in a personal profile of storage 212 of FIG. 2. Moreover, the generation component 402 can receive information from the user through an interface component such as a starting point and intended destination. From the received information, a route can be constructed according to desired constraints (e.g., fastest time, shortest distance, avoiding tolls, etc.).

The constructed route can be gathered by a collection component 102 and retained in storage 212 of FIG. 2. The collection component 102 can perform analysis upon the route and determine sources that are likely to produce relevant augmentation information. The collection component 102 can discover sources and extract information likely to be beneficial. A resolution can be made if an augmentation of the route should take place based on obtained information through utilization of a selection component 104.

A route can be modified based upon a result of the selection component 104 (e.g., deciding that an alteration should be made) through use of an implementation component 404. The implementation component 404 augments the route with information from the auxiliary source, commonly when the selection component 104 produces a positive result. Augmentation allows a route to be modified, information to be added to a route (e.g., a street commonly known as 'Main Street' has recently changed in name to 'MLK Drive'), inaccurate information to be removed (e.g., outdated warnings of heavy traffic congestion), etc.

The augmented route can be presented to the user through a disclosure component 406. A disclosure component 406 allows an individual to appreciate a direction set and act upon the direction set. A non-exhaustive list of disclosure components include a display screen, touch screen, speaker system, virtual reality environment, Braille production system, printer, etc. In addition, the disclosure component 406 can present information in multiple formats, such as showing a video with audio capabilities.

Figure 5:
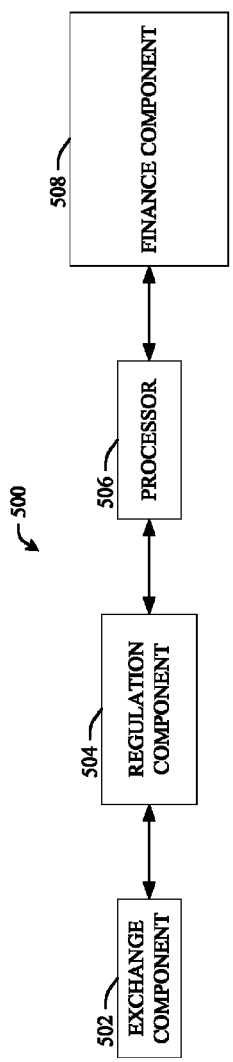
FIG. 5 illustrates a representative supplemental information source provider system in accordance with an aspect of the subject specification.

Now referring to FIG. 5, an example auxiliary source 500 is disclosed that provides information for route alteration. An exchange component 502 can engage with other devices in information transfer. Operation can take place wirelessly, in a hard-wired manner, employment of security technology (e.g., encryption), etc. Moreover, the exchange component 502 can utilize various protective features, such as performing a virus scan on obtained data and blocking information that is positive for a virus. The exchange component 502 can operate as a means for collecting a request to obtain information concerning local paths. The request can originate from an entity that is making the request in order to augment a direction set (e.g., a vehicle operating the system 100 of FIG. 1).

Information from the exchange component can be analyzed by a regulation component 504. The auxiliary source 500 can hold information in storage that has different characteristics, such as quality, sensitivity, accuracy, etc. Based on various factors (e.g., information factors, request factors, contextual factors, such as communication strength quality), the regulation component 504 can determine if at least part of information is to be transferred to a unit (e.g., a requester, a third party, etc.). If a request is denied, the regulation component can send a notice to a requestor through use of the exchange component 502. The regulation component 504 can function as a means for determining if a requesting entity is authorized to be provided the information concerning local paths.

If the regulation component 504 determines that information should be provided, then a processor 506 can transmit the information. For example, the processor can extract the information from storage, encrypt the information, and transfer it to an intended location through use of the exchange component 502. However, if the regulation component 504 denies a request, then the processor 506 can send out a denial notice. The processor 506 can implement as a means for acting upon the determination result. Acting upon the determination result can include providing a portion less than a whole of information requested, providing the information, or denying the information request.

The auxiliary source 500 can require payment for information to be transmitted, information to be used in route augmentation, etc. A finance component 508 can determine payment capabilities of a user (e.g., requesting unit) and make appropriate actions for payment (e.g., withdraw money from an account associated with a requesting unit). According to one embodiment, the finance component 508 can work in conjunction with the transaction component 308 of FIG. 3. The finance component 508 can operate as a means for performing an economic function in relation to acting upon the determination result.

In addition, actions for payment can take place in relation to user response to a commercial detail (e.g., presented with a route). For example, an advertisement can be played that a user should stop at a highway exit for a cup of coffee. If the user takes the exit, buys the cup of coffee, buys a different item, etc., then payments of varying amounts can be made to an advertisement hosting service.

Figure 6:
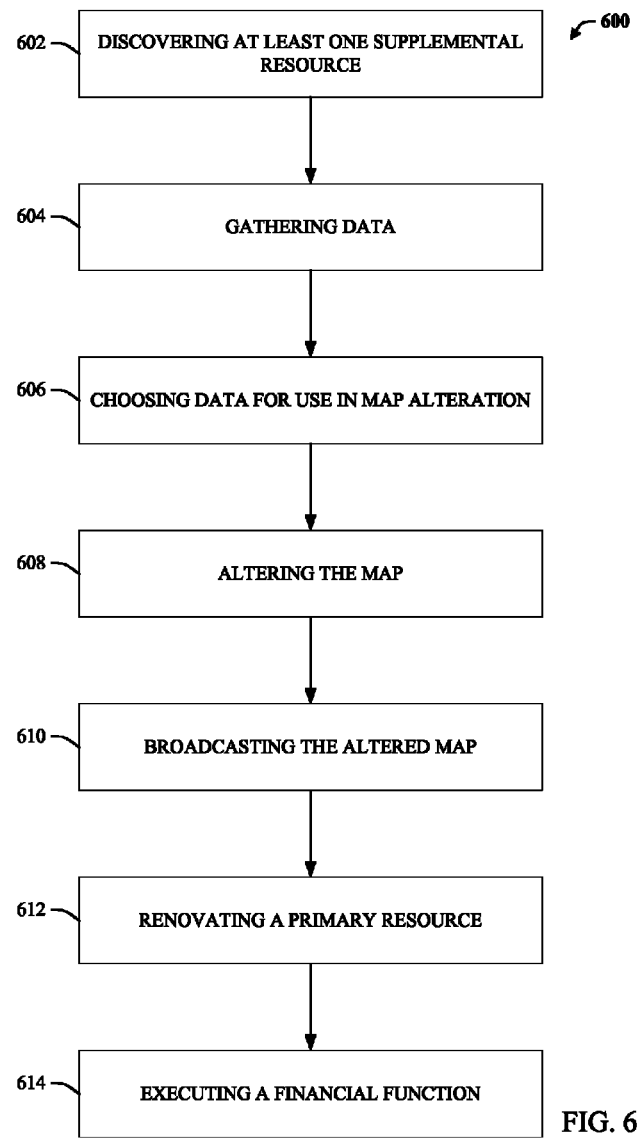
FIG. 6 illustrates a representative route augmentation methodology in accordance with an aspect of the subject specification.

Now referring to FIG. 6, a methodology 600 is disclosed that performs actions in conjunction with augmenting a map with information from a supplemental resource (e.g., raw street information, a route solution, etc.). While disclosed as a methodology for altering a map, it is to be appreciated that aspects disclosed in the methodology 600 (and related methodologies) can be used in altering a route. At block 602, a search can take place to discover supplemental sources that can produce information relevant to augmentation. Discovering resources can include determining a resource Internet Protocol address, extracting location information from storage, monitoring airways, etc.

Event 604 allows data to be gathered from the supplemental resource that can be used to augment a map. According to one embodiment, a supplemental resource can freely offer information concerning newly constructed roads, where the information is held in a database. A link can be established with the supplemental resource, the information can be downloaded to local storage, scanned for viruses and inconsistencies, and the like.

Moving to action 606, a choice is made concerning which data will be used to alter a map. Detailed analysis can take place in order to determine an information piece that should be used for alteration and/or an information piece that should be ignored. In addition, there can be an evaluation as to how information will be used. For instance, data can be received disclosing new roads of a development and proposed road names; however, the new roads do not have signs posted listing the proposed names. Action 606 can determine that the roads should be used to alter the map (e.g., added to the map), however, names should not be added since they are proposed names and signs will likely not be posted that can be followed by a user.

At block 608, the map can be altered to reflect the choice made in action 606. This can include adding information to an existing map (e.g., placing new roads in blank areas), deleting map aspects and replacing the aspects with chosen data (e.g., 'Vine Street' is actually called 'Wine Street' and a map change is made), etc. A check can be made to ensure that alterations are appropriate. For instance, a global positioning system can be checked to ensure a newly displayed road is not leading a user in a dangerous situation (e.g., off a cliff).

Event 610 allows an altered map to be broadcast to a user. Commonly broadcasting includes disclosing the map through use of a presentment component, such as a monitor. This can be done upon a screen integrated in a vehicle; however, other embodiments can be used, such as transmitting the map to a mobile telephone associated with the user.

At block 612, a primary resource (e.g., a producer of an initial map) can have a database altered with information from the supplemental resource. Primary resource renovation enables new maps to be generated that include 'up-to-date' information. According to one embodiment, a notification is sent to a primary resource suggesting changes that should be made. However, renovation can be more forceful, where renovation takes place automatically without primary resource approval.

Various financial transactions can take place in relation to methodology 600, and these transactions can be implemented at act 614. Two example transactions include a fee to be paid to a supplemental resource for providing new information and a fee to be paid for renovating the primary resource. Money can be extracted from an account of a user to be paid to a supplemental resource and money can be credited to the account for providing the update. Included in act 614 is determining an amount that should be paid, a type of reward that should be paid (e.g., monetary, non-monetary, etc.), how to carry out a transaction (e.g., through use of credit card accounts, wire transfers, etc.).

Additionally, act 614 can include operating an auction for advertisement disclosure in conjunction with route augmentation. For instance, a user can be traveling to a large shopping plaza with an indoor mall. A request can be made to a supplemental resource for information that can be used to augment a route to lead a user to the mall. The request can include demographic information of passengers in a vehicle and a host can run an auction to stores in the mall such that an advertisement is disclosed with the route or that a route lead a user to a mall door that in near a particular store (e.g., a store associated with a winning bid). Act 614 allows for the auction to be run as well as for finances to transfer between different parties.

Figure 7:
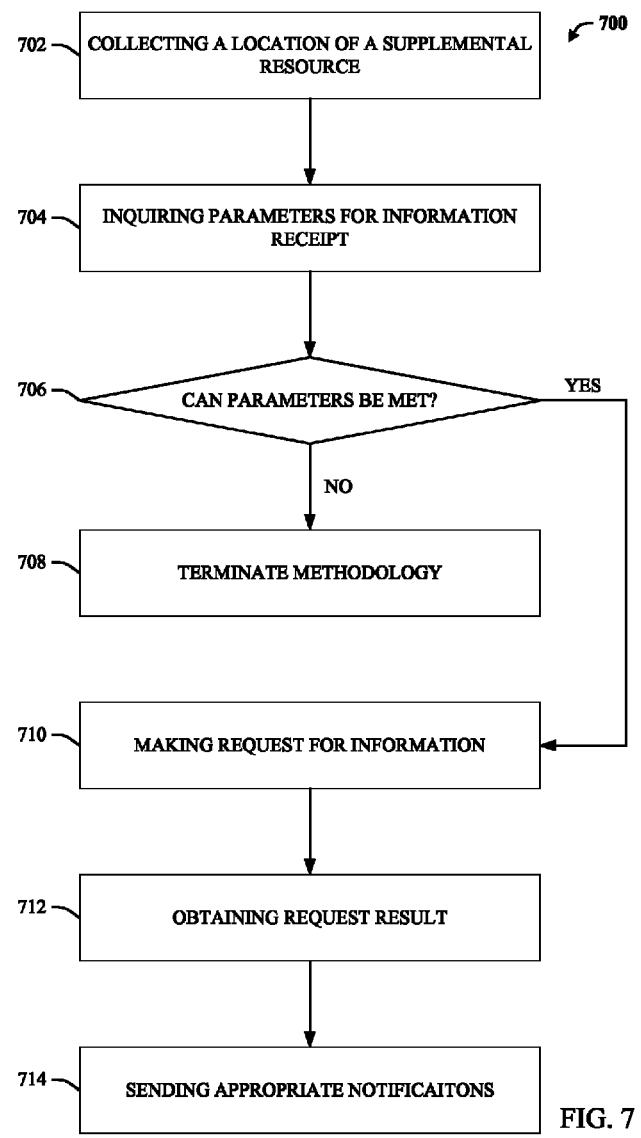
FIG. 7 illustrates a representative information gathering methodology in accordance with an aspect of the subject specification.

FIG. 7 discloses an example methodology 700 for gathering data from a supplemental resource that can represent an example implementation of event 604 of FIG. 6. At event 702, a location for a supplemental resource is collected. It is to be appreciated that this is an example where information is obtained from a source; the methodology 700 can be implemented to obtain information from open airways as well as other configurations.

Moving to block 704, an inquiry can be made as to parameters that associate with information collection. A supplemental resource can desire to receive payment for providing information, for information to be kept under strict confidentiality, can require authentication (user name and password, for example) to access the information, etc. Commonly, the inquiry can be made through sending a message to the supplemental resource, extracting metadata related to information, etc.

A check 706 can take place to determine if the parameters can be met. For instance, in order to obtain information, an amount of money is to be paid; however, the user does not have enough money in her account to meet the parameter. In another example is the user does not have valid credentials to access the data. Therefore, the methodology can be terminated at event 708 (e.g., an original map remains intact without alteration). In an alternative embodiment, other actions can take place if parameters cannot be met. For example, a request can be made to a user to authorize an account to transfer into a negative amount when an account has inadequate funds.

If parameters can be met, then event 710 allows a request to be made to the supplemental resource for information capable of being used to alter a map. The request can be pointed, such as requesting information related to airspace that has relatively frequent airplane travel. However, a request can be general in nature, such as asking for information without a specific direction.

Moving to block 712, a result to the request is obtained and processed. If the supplemental resource denies the request, then a denial is obtained. However, the supplemental resource can send at least a portion of the information, where the information can be retained in storage. In addition, various processes can take place upon the obtained information, such as scanning for viruses, compressing information, verifying consistency, and the like.

Different notices can be beneficial for operation of the methodology 700 as well as related actions, so there can be sending appropriate notifications at event 714. For instance, the supplemental resource can benefit from receiving a notification that information was successfully obtained. The notice can be sent and the supplemental resource can perform financial actions based upon the notice.

Figure 8:
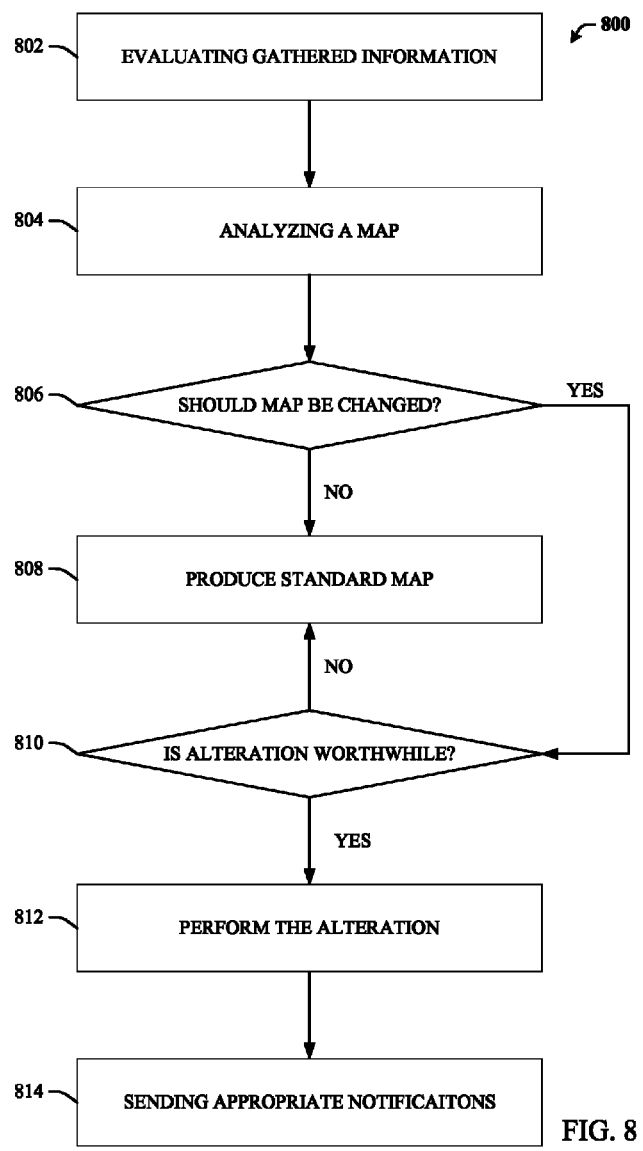
FIG. 8 illustrates a representative information selection methodology in accordance with an aspect of the subject specification.

FIG. 8 discloses an example methodology 800 for gathering data from a supplemental resource that can represent a representative implementation of action 606 of FIG. 6. Gathered information can be analyzed at event 802, such as determining accuracy of information, how recently information is obtained, veracity of an information source, etc. Moreover, information can be checked against certain standards; in an illustrative example, if it is known 'Main Street' runs parallel to 'Market Street', a check can be made to assure the known configuration is not broken by obtained information.

Moving on the block 804, a map can be analyzed to determine characteristics of the map. For instance, there can be a check on how long ago a map was last altered. If a long time has passed since a previous alteration, then this can signal that the map could benefit from a change. Also, other known maps can be examined to see if similar information has been used with success.

A check 806 can be made to determine if the map should be changed. If comparison of the map against obtained information determines that there are several deficiencies (e.g., shipping lanes are shown in the information that are not represented in the map), then an alteration can be approved. However, if an alteration is not to take place (e.g., obtained information is not from a reputable source), then a standard map can be produced 808.

A check 810 can occur to determine if an alteration is worthwhile to a user. For instance, a slight modification can cost a user a relatively large amount of money. A determination can be made that the modification would not be a beneficial expenditure of funds for the user and a result can be made that the map should not be changed. If the map is not to be changed, then the standard map can be produced at event 808.

Various notices can be beneficial for operation of the methodology 800 as well as related actions, so there can be sending appropriate notifications at event 814. For instance, the supplemental resource can benefit from receiving a notification that information was successfully utilized when altering a map. The notice can be sent and the supplemental resource can perform financial actions based upon the notice.

If a map should be changed and the change would be worthwhile, then an alteration can be made at event 812. While the alteration can be a straight modification of a map (e.g., placing information into a map), it is possible for variations to take place. For instance, obtained information can use colors to show data, while a display unit implemented with the methodology 800 cannot display colors. Event 812 can make a modification to the information such that the alteration allows for words to be disclosed as opposed to colors (e.g., information is send where red roads have heavy traffic, the alteration allows for a word 'heavy' to be shown on the road).

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media. Moreover, while a subset of the subject specification discloses operation of aspects though utilization of a vehicle, it is to be appreciated aspects can be practiced through alternative manners (e.g., walking, swimming, etc.)

Figure 9:
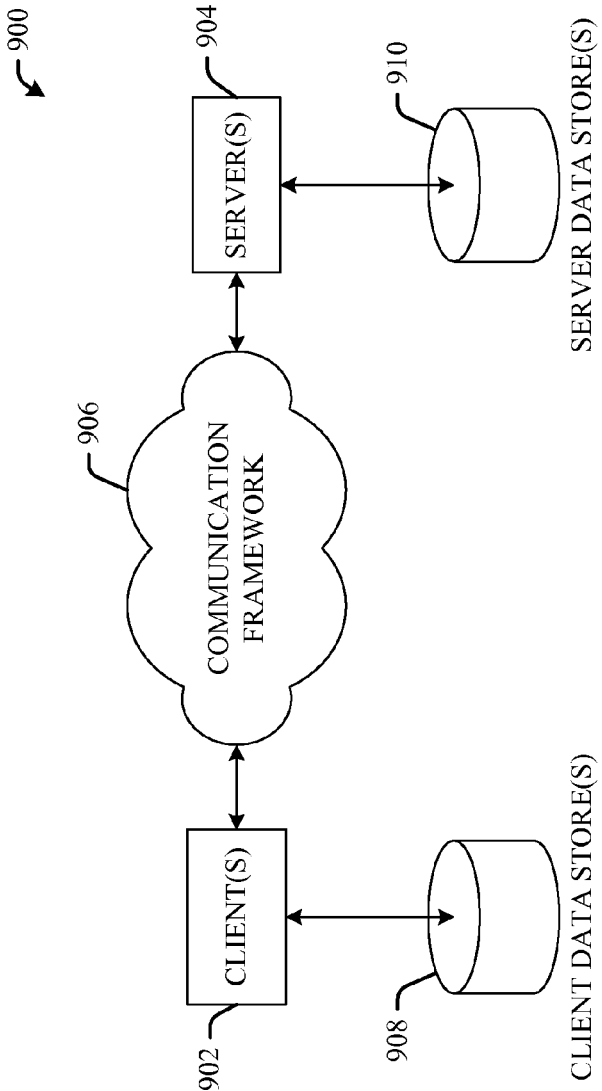
FIG. 9 illustrates an example of a schematic block diagram of a computing environment in accordance with the subject specification.
Figure 10:
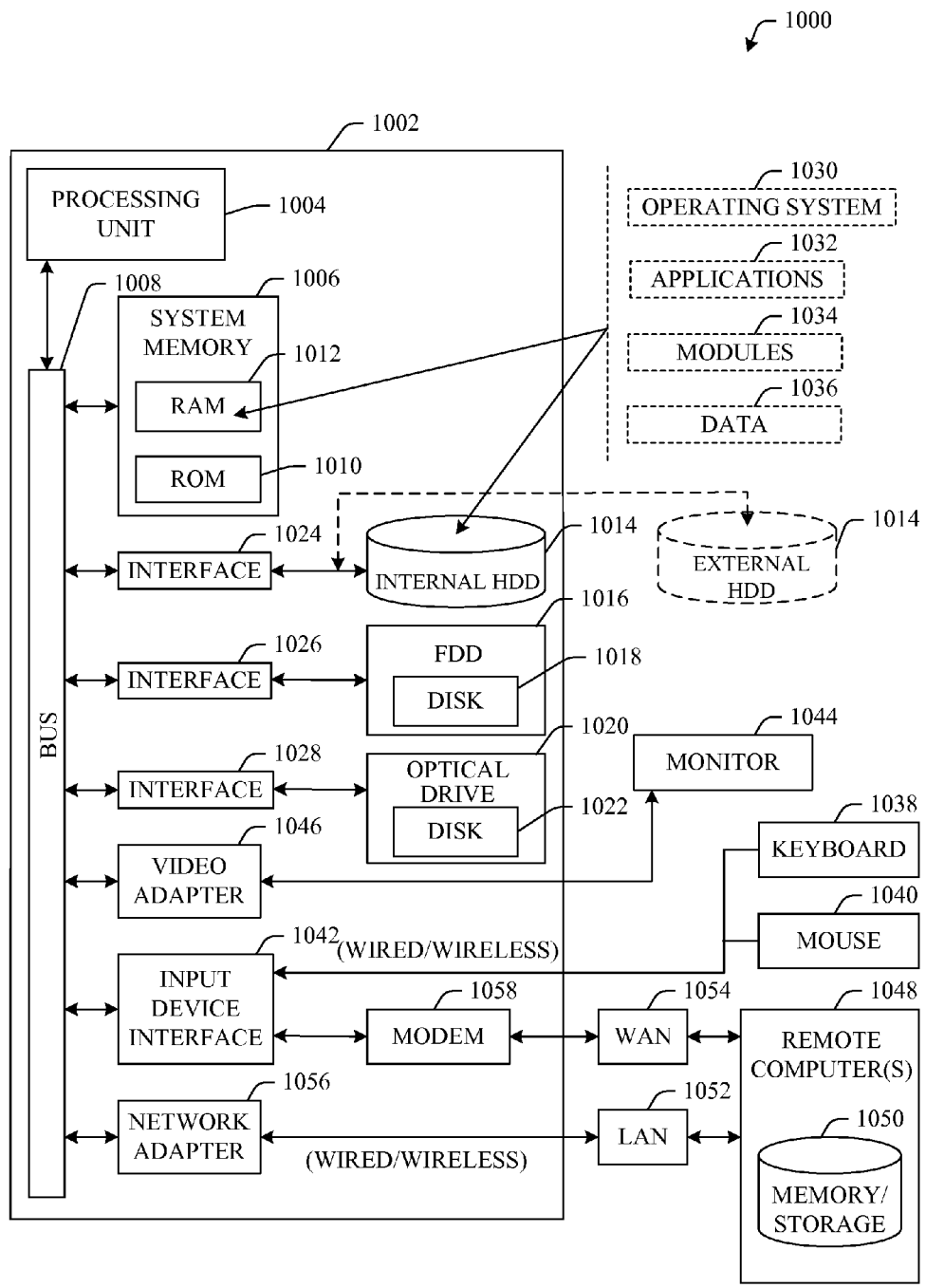
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction between several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
    a processor coupled to a computer storage medium, the computer storage medium not consisting of a communication signal;
    the computer storage medium that stores thereon a plurality of computer software components executable by the processor;
    a collection component that obtains information from an auxiliary source and from similar systems to the system, the similar systems signifying whether the information obtained from the auxiliary source was of poor quality;
    a selection component that utilizes the information from similar systems to determine if a change should be made, based on information from a poor quality source, to a route generated by a primary source.

2. The system of claim 1, further comprising an implementation component that augments the route with information from the auxiliary source.

3. The system of claim 2, further comprising a disclosure component that presents the augmented route to a user.

4. The system of claim 1, further comprising a security component that engages the auxiliary source such that the auxiliary source is able to validate a request for the information obtainment.

5. The system of claim 1, further comprising an election component that designates an auxiliary source from which to use information from a plurality of auxiliary sources.

6. The system of claim 1, further comprising an artificial intelligence component that makes at least one inference or at least one determination in relation to the information obtainment or the information augmentation resolution.

7. The system of claim 1, further comprising a transaction component that performs a fiscal operation in relation to the information obtainment or the information augmentation resolution.

8. The system of claim 1, further comprising a search component that locates the auxiliary source or information produced by the auxiliary source.

9. The system of claim 1, further comprising an analysis component that evaluates the obtained information, resolution of the selection component is based upon a result of the evaluation.

10. The system of claim 1, further comprising an update component that alters information in the primary source based upon information obtained from the auxiliary source.

11. Computer storage media, not consisting of a communication signal, storing computer-useable instructions that, when used by one or more computing devices, cause the one or more computer devices to perform a method, comprising:
    gathering data from a supplemental resource;
    using a history about the supplemental resources to determine if a change should be made based on the data, the history signifying whether the data from the supplemental resource was of poor quality;
    taking into account history specific to a user; and
    choosing data from the supplemental resource for use in map alteration, wherein the map is produced through use of data from a principle resource.

12. The computer storage media of claim 11, wherein the method further comprises altering the map based upon chosen data from the supplemental resource.

13. The computer storage media of claim 12, wherein the method further comprises broadcasting the altered map.

14. The computer storage media of claim 11, wherein the method further comprises discovering the supplemental resource.

15. The computer storage media of claim 11, wherein the method further comprises renovating the principle resource with data gathered from the supplemental resource.

16. The computer storage media of claim 11, wherein the method further comprises executing a financial function in relation to gathering data from the supplemental source.

17. A system comprising:
a processor coupled to a computer storage medium, the computer storage medium not consisting of a communication signal;
the computer storage medium that stores thereon a plurality of computer software components executable by the processor;
an exchange component for collecting a request to obtain information concerning local paths and engage other devices to obtain information for route alteration, wherein a history about the other devices is used to determine if a change should be made based on the information, the history signifying whether the information from the other devices was of poor quality;
a regulation component for determining if a requesting entity is authorized to be provided the information concerning local paths;
the processor for acting upon the determination result; and
a security component for determining if another source can provide similar information if the information is not provided or a portion of the requested information is provided.

18. The system of claim 17, wherein acting upon the determination result includes providing a portion less than a whole of information requested, providing the information, or denying the information request.

19. The system of claim 17, further comprising a finance component for performing an economic function in relation to acting upon the determination result.

20. The system of claim 17, wherein the request originates from an entity that is making the request in order to augment a direction set.

\* \* \* \* \*